(12) United States Patent
Fujimoto et al.

(10) Patent No.: US 11,161,148 B2
(45) Date of Patent: Nov. 2, 2021

(54) VIBRATING DEVICE, CAMERA WATER-DROPLET-REMOVING DEVICE, AND CAMERA

(71) Applicant: Murata Manufacturing Co., Ltd., Nagaokakyo (JP)

(72) Inventors: Katsumi Fujimoto, Nagaokakyo (JP); Chikahiro Horiguchi, Nagaokakyo (JP); Kenji Nishiyama, Nagaokakyo (JP); Yasuhiro Kuratani, Nagaokakyo (JP); Shinichiro Ichiguchi, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 365 days.

(21) Appl. No.: 16/274,287

(22) Filed: Feb. 13, 2019

(65) Prior Publication Data
US 2019/0176195 A1    Jun. 13, 2019

Related U.S. Application Data

(63) Continuation of application No. PCT/JP2017/026887, filed on Jul. 25, 2017.

(30) Foreign Application Priority Data

Nov. 30, 2016    (JP) ............................. JP2016-232611

(51) Int. Cl.
*B06B 1/06* (2006.01)
*G03B 15/00* (2021.01)
(Continued)

(52) U.S. Cl.
CPC .............. *B06B 1/06* (2013.01); *B06B 1/0607* (2013.01); *B60S 1/0848* (2013.01); *G02B 7/02* (2013.01);
(Continued)

(58) Field of Classification Search
CPC .... B06B 1/06; B06B 1/0607; H04N 5/22521; H04N 5/225; H04N 5/2254; B60S 1/0848;
(Continued)

(56) References Cited

U.S. PATENT DOCUMENTS

| 2018/0239218 A1* | 8/2018 | Ikeuchi | G02B 27/0006 |
| 2019/0151897 A1* | 5/2019 | Fujimoto | H04N 5/2171 |
| 2019/0176195 A1* | 6/2019 | Fujimoto | H04N 5/225 |

FOREIGN PATENT DOCUMENTS

| JP | 03-159378 A | 7/1991 | |
| JP | H03159378 | * 7/1991 | ................ E01F 9/00 |

(Continued)

OTHER PUBLICATIONS

Official Communication issued in International Patent Application No. PCT/JP2017/026887, dated Sep. 12, 2017.

*Primary Examiner* — Clayton E. LaBalle
*Assistant Examiner* — Kevin C Butler
(74) *Attorney, Agent, or Firm* — Keating & Bennett, LLP

(57) ABSTRACT

A vibrating device includes a tubular body including a first end, a second end, and a plurality of side surfaces that connect the first and second ends, piezoelectric vibrators that are fixed to the tubular body and vibrate the tubular body, and a light transmitting body unit that is directly or indirectly connected to the second end of the tubular body.

19 Claims, 10 Drawing Sheets

(51) Int. Cl.
*G03B 17/08* (2021.01)
*G02B 27/00* (2006.01)
*G03B 17/56* (2021.01)
*G02B 7/02* (2021.01)
*H04N 5/225* (2006.01)
*G03B 17/02* (2021.01)
*B60S 1/08* (2006.01)

(52) U.S. Cl.
CPC ......... *G02B 27/0006* (2013.01); *G03B 15/00* (2013.01); *G03B 17/02* (2013.01); *G03B 17/08* (2013.01); *G03B 17/56* (2013.01); *H04N 5/225* (2013.01); *H04N 5/2254* (2013.01); *H04N 5/22521* (2018.08); *G02B 7/021* (2013.01)

(58) Field of Classification Search
CPC ...... G02B 7/02; G02B 27/0006; G02B 7/021; G03B 15/00; G03B 17/02; G03B 17/08; G03B 17/56
USPC ......................................................... 310/311
See application file for complete search history.

(56) References Cited

FOREIGN PATENT DOCUMENTS

| | | | | |
|---|---|---|---|---|
| JP | 05-32191 U | | 4/1993 | |
| JP | H0532191 | * | 4/1993 | ............... B60R 1/00 |
| JP | 2007-082062 A | | 3/2007 | |
| JP | 2012-138768 A | | 7/2012 | |
| JP | 2013-080177 A | | 5/2013 | |
| JP | 2013080177 | * | 5/2013 | ............... B60R 1/00 |

* cited by examiner

VIBRATING DEVICE, CAMERA WATER-DROPLET-REMOVING DEVICE, AND CAMERA

CROSS REFERENCE TO RELATED APPLICATIONS

This application claims the benefit of priority to Japanese Patent Application No. 2016-232611 filed on Nov. 30, 2016 and is a Continuation Application of PCT Application No. PCT/JP2017/026887 filed on Jul. 25, 2017. The entire contents of each application are hereby incorporated herein by reference.

BACKGROUND OF THE INVENTION

1. Field of the Invention

The present invention relates to a vibrating device including a piezoelectric vibrator and a tubular body, a camera water-droplet-removing device including the vibrating device, and a camera.

2. Description of the Related Art

Vehicle-mounted cameras and cameras installed outdoors are exposed to rain. Accordingly, a cover made of glass or transparent plastic is placed in front of a lens. However, water droplets that have adhered to the cover may reduce the clarity of the view of the camera and hinder accurate image capture.

Japanese Unexamined Patent Application Publication No. 2012-138768 discloses a dome-shaped cover for such use. The dome-shaped cover is connected to a cylindrical portion, and a piezoelectric ceramic vibrator is attached to the cylindrical portion. The piezoelectric ceramic vibrator is vibrated to vibrate the cylindrical portion and the dome-shaped cover, thus removing water droplets that have adhered to the surface of the dome-shaped cover.

Japanese Unexamined Patent Application Publication No. 2007-82062 discloses a structure in which an ultrasonic transducer, an adhesive layer, and an external lens are disposed in front of a camera main body. The ultrasonic transducer is driven to vibrate the external lens, thus removing water droplets.

According to Japanese Unexamined Patent Application Publication No. 2012-138768 and Japanese Unexamined Patent Application Publication No. 2007-82062, large vibration of the dome-shaped cover or the external lens needs to be generated to remove the water droplets. Furthermore, substances to be removed include not only water droplets but also solutions other than water, such as ethanol, aqueous solutions of salt, an antifreezing agent (calcium chloride), etc., droplets of liquid containing water insoluble impurities, such as mud water, and colloidal solutions, such as coffee. Thus, according to the structures of Japanese Unexamined Patent Application Publication No. 2012-138768 and Japanese Unexamined Patent Application Publication No. 2007-82062, the piezoelectric ceramic vibrator or the ultrasonic transducer is required to generate large vibration. Accordingly, the piezoelectric ceramic vibrator or the ultrasonic transducer receives large stress, and cracks may be formed therein as a result of use over time. This may lead to malfunction of the piezoelectric ceramic vibrator or the ultrasonic transducer.

SUMMARY OF THE INVENTION

Preferred embodiments of the present invention provide vibrating devices that do not impart a large load on a piezoelectric vibrator, camera water-droplet-removing devices and cameras, each of which is capable of easily removing water droplets or other substances that have adhered to a light transmitting body unit, such as a cover or a lens, without imparting a large load on a piezoelectric vibrator.

A vibrating device according to a preferred embodiment of the present invention includes a tubular body including one end, another end that is opposite to the one end, and a plurality of side surfaces that connect the one end and the other end; a piezoelectric vibrator that is fixed to the tubular body and vibrates the tubular body; and a light transmitting body unit that is directly or indirectly connected to the other end of the tubular body.

In a vibrating device according to a preferred embodiment of the present invention, the tubular body has a polygonal tubular shape.

In a vibrating device according to a preferred embodiment of the present invention, adjacent ones of the side surfaces are connected to each other by a curved portion. Thus, the adjacent ones of the side surfaces may be connected to each other by a curved portion.

In a vibrating device according to a preferred embodiment of the present invention, the piezoelectric vibrator is provided on one of the side surfaces of the tubular body.

In a vibrating device according to a preferred embodiment of the present invention, the tubular body has a quadrangular prismatic external shape, and the side surfaces include first to fourth side surfaces.

In a vibrating device according to a preferred embodiment of the present invention, at least two of the first to fourth side surfaces are each provided with the piezoelectric vibrator. In this case, vibrations in different modes are able to be generated by adjusting the directions of polarization of the piezoelectric vibrators provided on the two side surfaces and the direction of an alternating-current voltage.

In a vibrating device according to a preferred embodiment of the present invention, the first to fourth side surfaces are each provided with the piezoelectric vibrator. In this case, vibrations in different modes are able to be easily excited.

In a vibrating device according to a preferred embodiment of the present invention, the vibrating device further includes a mode changing coupler connected between the tubular body and the light transmitting body unit. In this case, breathing vibration of the tubular body that has been generated is able to be easily converted into vibration in an appropriate vibration mode suitable to move and atomize water droplets on the light transmitting body unit.

In a vibrating device according to a preferred embodiment of the present invention, the mode changing coupler is a tubular body including portions having different thicknesses.

In a vibrating device according to a preferred embodiment of the present invention, the tubular body includes a cavity that extends from the one end toward the other end and that is circular in plan view when viewed from the one end, and an end portion of the mode changing coupler adjacent to the one end of the tubular body and an end portion of the tubular body at the one end of the tubular body are connected to each other by a connecting portion. An outer surface of the mode changing coupler faces an inner surface of the cavity in the tubular body.

A camera water-droplet-removing device according to a preferred embodiment the present invention is a camera water-droplet-removing device for a camera main body including a lens, and includes a vibrating device according to a preferred embodiment of the present invention. The light transmitting body unit includes the lens of the camera main body or a cover including a light transmitting portion disposed in front of the lens of the camera main body.

A camera according to a preferred embodiment of the present invention includes a camera water-droplet-removing device including a vibrating device according to a preferred embodiment of the present invention and a camera main body, at least a portion of which is contained in the camera water-droplet-removing device.

With the vibrating devices, camera water-droplet-removing devices and cameras according to preferred embodiments of the present invention, water droplets or other substances that have adhered to a light transmitting body unit, such as a lens or a cover, are able to be easily removed without imparting a large load on a piezoelectric vibrator.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described below with reference to the accompanying drawings.

It is to be noted that each of the preferred embodiments described in this specification is illustrative, and partial replacements and combinations of the structures of different preferred embodiments are possible.

Figure 1:
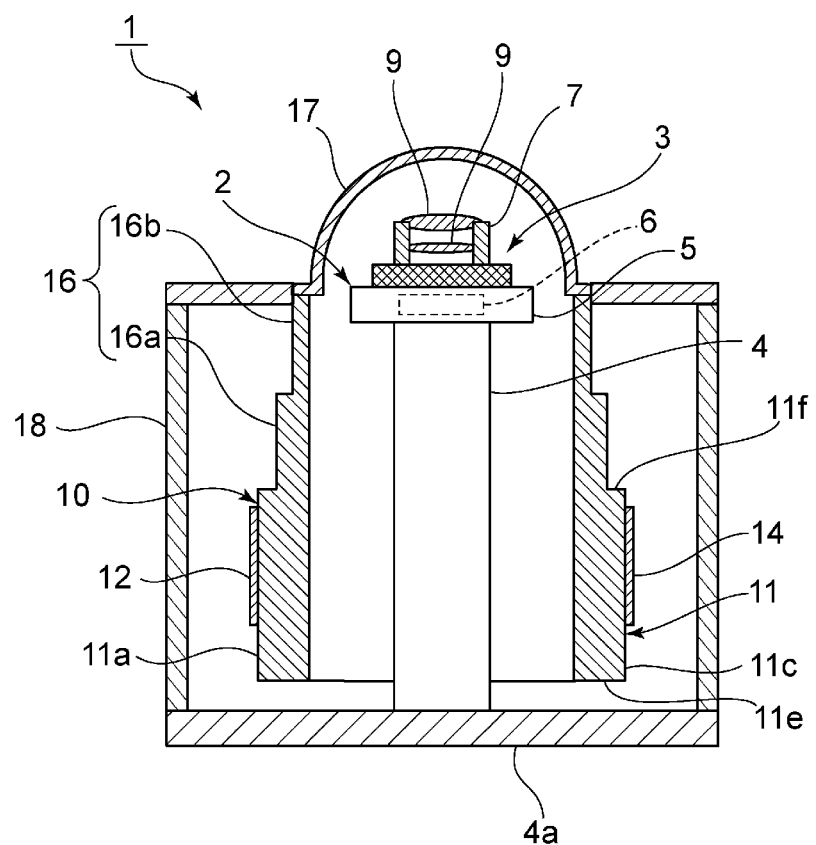
FIG. 1 is a front sectional view of a camera according to a first preferred embodiment of the present invention.
Figure 2A:
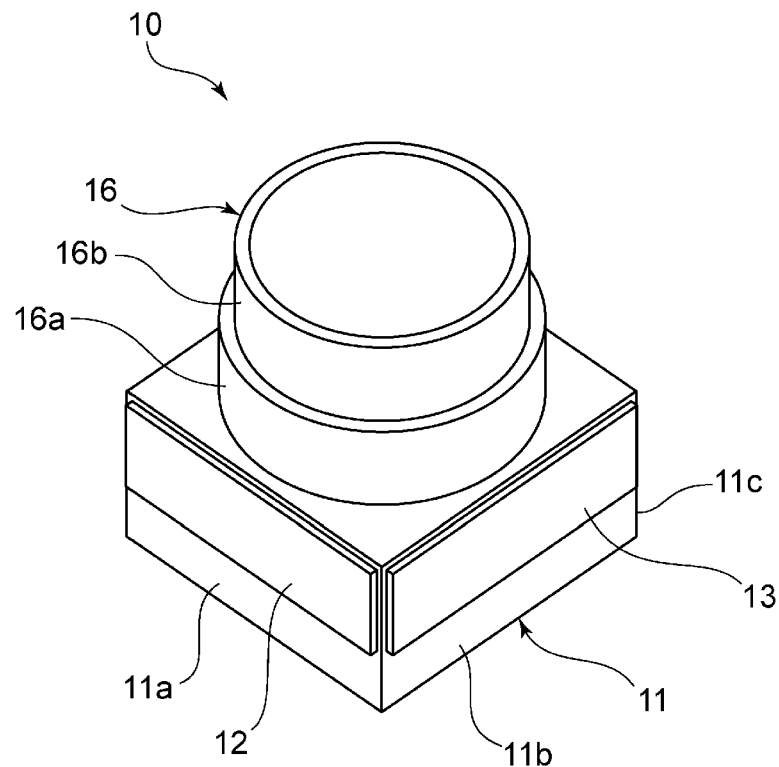
FIG. 2A is a perspective view of a main portion of a vibrating device from which a light transmitting body unit is removed.
Figure 2B:
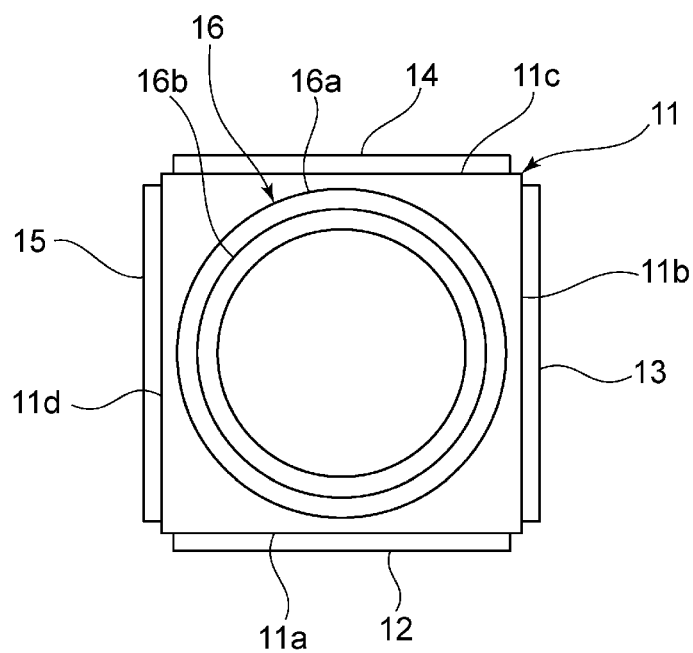
FIG. 2B is a plan view of the main portion.
Figure 3:
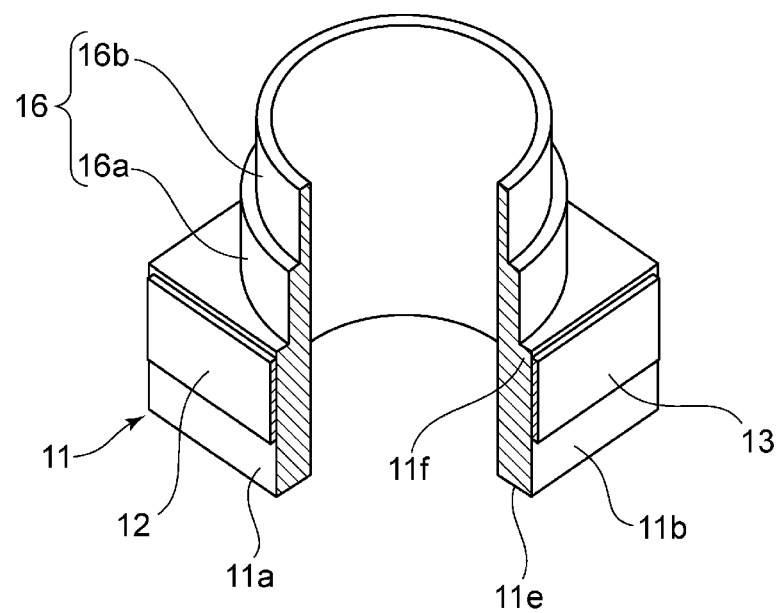
FIG. 3 is a partially cutaway sectional perspective view of the main portion of the vibrating device illustrated in FIGS. 2A and 2B.

FIG. 1 is a front sectional view of a camera according to a first preferred embodiment of the present invention. FIG. 2A is a perspective view of a main portion of a vibrating device from which a light transmitting body unit is removed. FIG. 2B is a plan view of the main portion. FIG. 3 is a partially cutaway sectional perspective view of the main portion.

A camera 1 includes a camera water-droplet-removing device 2. The camera water-droplet-removing device 2 includes a camera main body 3. It is not necessary that the entirety of the camera main body 3 be contained in the camera water-droplet-removing device 2 as long as at least a portion of the camera main body 3 is contained in the camera water-droplet-removing device 2.

The camera main body 3 includes a tubular main body member 4. The bottom end of the main body member 4 is fixed to a base plate 4a. An imaging unit 5 is fixed to the top end of the main body member 4. A circuit 6 including an imaging device is mounted in the imaging unit 5. A lens module 7 is secured such that the lens module 7 faces the imaging unit 5. The lens module 7 includes a tubular body. A plurality of lenses 9 are disposed in the lens module 7.

The structure of the camera main body 3 is not particularly limited as long as the camera main body 3 is capable of capturing an image of an object in front of the lenses 9.

The camera water-droplet-removing device 2 includes a vibrating device 10. The vibrating device 10 is an example of a vibrating device according to a preferred embodiment of the present invention.

The vibrating device 10 includes a tubular body 11 and first to fourth piezoelectric vibrators 12, 13, 14, and 15. The tubular body 11 preferably has a polygonal tubular shape. More specifically, the tubular body 11 preferably has a quadrangular prismatic external shape, and includes first to fourth side surfaces 11a to 11d. The first to fourth side surfaces 11a to 11d connect one end 11e of the tubular body 11 and another end 11f of the tubular body 11 that is opposite to the one end 11e. The other end 11f of the tubular body 11 is connected to a mode changing coupler 16 including a tubular member. The mode changing coupler 16 includes a cavity at the center.

An end portion of the mode changing coupler 16 at the end opposite to the end connected to the tubular body 11 is fixed to a light transmitting body unit 17. Thus, the light transmitting body unit 17 is indirectly connected to the other end 11f. At least a portion of the light transmitting body unit 17 that is in front of the lenses 9 is defined by a light transmitting portion. In the present preferred embodiment, the entirety or substantially the entirety of the light transmitting body unit 17 transmits light. The light transmitting body unit 17 is preferably dome-shaped, but may instead have other shapes, such as a flat plate shape, for example, as long as the light transmitting body unit 17 is disposed in front of the lenses 9.

The light transmitting portion of the light transmitting body unit 17 is preferably made of a transparent material. Examples of such a material include glass and transparent plastic. Preferably, the light transmitting body unit 17 covers the cavity in the mode changing coupler 16 and is joined to the mode changing coupler 16 along the entire or substantially the entire circumference of the end portion of the mode changing coupler 16 at the end opposite to the end connected to the tubular body 11.

In the present preferred embodiment, the vibrating device 10 includes the first to fourth piezoelectric vibrators 12 to 15.

One end of a support member 18 is connected to an outer surface of a side wall portion of the mode changing coupler 16, and the other end is fixed to the base plate 4a.

As illustrated in FIGS. 2A and 2B, the first to fourth piezoelectric vibrators 12 to 15 are respectively fixed to the first to fourth side surfaces 11a to 11d of the tubular body 11 having a quadrangular prismatic external shape.

Figure 4:
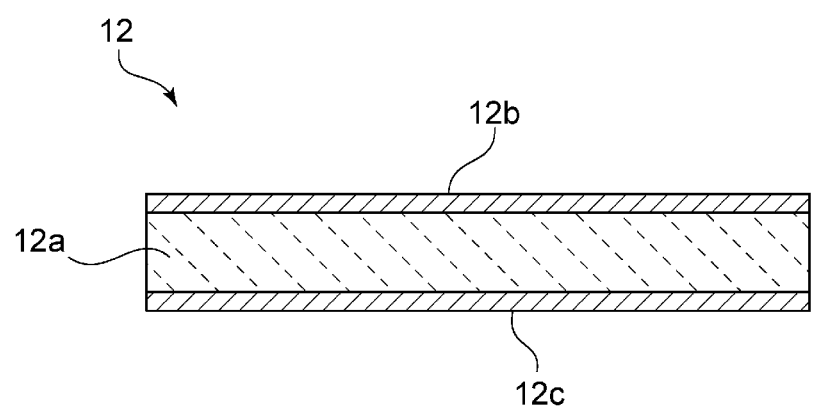
FIG. 4 is a front sectional view of a first piezoelectric vibrator used in the first preferred embodiment of the present invention.

The first to fourth piezoelectric vibrators 12 to 15 include plate-shaped piezoelectric ceramic bodies. The first piezoelectric vibrator 12 will be described with reference to FIG. 4 as a representative example. The first piezoelectric vibrator includes a piezoelectric ceramic plate 12a and excitation electrodes 12b and 12c provided on the end surfaces of the piezoelectric ceramic plate 12a. The piezoelectric ceramic plate 12a is preferably made of a piezoelectric ceramic, such as PZT, for example. The direction of polarization of the piezoelectric ceramic plate 12a is not particularly limited, but is preferably the thickness direction in the present preferred embodiment. Bending vibration of the first piezoelectric vibrator 12 is generated in response to an alternating-current electric field applied by the excitation electrodes 12b and 12c.

The second to fourth piezoelectric vibrators 13 to 15 have the same or similar structure.

The piezoelectric vibrators are not limited to single-plate piezoelectric vibrators, such as the first piezoelectric vibrator 12, and may instead be multilayer piezoelectric vibrators. Also, the piezoelectric vibrators may be either a unimorph vibrator or a bimorph vibrator.

The tubular body 11 is made of an elastic material, such as a metal, for example. Preferably, the tubular body 11 is made of stainless steel because stainless steel is highly anticorrosive.

Figure 5:
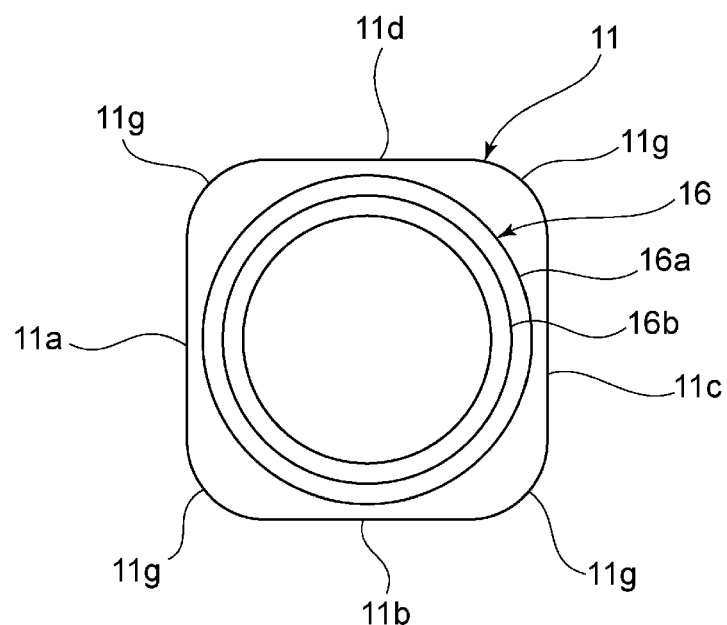
FIG. 5 is a plan view illustrating a modification of a tubular body according to the first preferred embodiment of the present invention.

As illustrated in FIG. 5, adjacent ones of the first to fourth side surfaces 11a to 11d may be connected to each other by a curved portion 11g. Thus, the tubular body 11 may have a substantially quadrangular prismatic external shape. According to preferred embodiments of the present invention, the tubular body 11 may instead have other polygonal tubular shapes, such as a triangular tubular shape or a pentagonal tubular shape, for example, as long as the tubular body 11 includes a plurality of side surfaces.

The tubular body 11 is able to be vibrated in various modes by controlling the vibrational phases of the first to fourth piezoelectric vibrators 12 to 15 when the first to fourth piezoelectric vibrators 12 to 15 are driven.

In the present preferred embodiment, the mode changing coupler 16 is integrally provided with the tubular body 11 using the same material as that of the tubular body 11. The mode changing coupler 16 may instead be a separate member from the tubular body 11 and be attached to the other end 11f of the tubular body 11.

The mode changing coupler 16 includes a thick portion 16a and a thin portion 16b. The thick portion 16a has a thickness greater than that of the thin portion 16b in the radial direction of the mode changing coupler 16. The thick portion 16a is connected to the tubular body 11. The light transmitting body unit 17 is fixed to an end of the thin portion 16b. The mode changing coupler 16 includes a tubular member including portions having different thicknesses as described above, and therefore increases the amount of vibration displacement while changing the mode of the vibration of the tubular body 11 that is excited. The mode changing coupler 16 may instead be configured such that the mode changing coupler 16 does not include portions having different thicknesses. In such a case, the mode changing coupler 16 does not increase the amount of displacement.

Specifically, the mode changing coupler 16 changes a breathing vibration mode, which is a mode of vibration of the tubular body 11 excited in the radial direction of the tubular body 11, to a bending vibration mode, which is a mode of vibration of the light transmitting body unit 17 in the axial direction of the tubular body 11. Thus, the mode changing coupler 16 changes the vibration mode and increases the amount of vibration displacement.

A method for driving the vibrating device 10 of the camera 1 and modes of vibration of the light transmitting body unit 17 that are excited will now be described.

In the present preferred embodiment, the piezoelectric ceramic plates of the first to fourth piezoelectric vibrators 12 to 15 are polarized in the directions from the outer surfaces thereof toward the tubular body 11 along the thickness directions thereof. In other words, when viewed from the tubular body 11, the first to fourth piezoelectric vibrators 12 to 15 are polarized in the same or substantially the same direction along the thickness directions of the piezoelectric ceramic plates.

Figure 6:
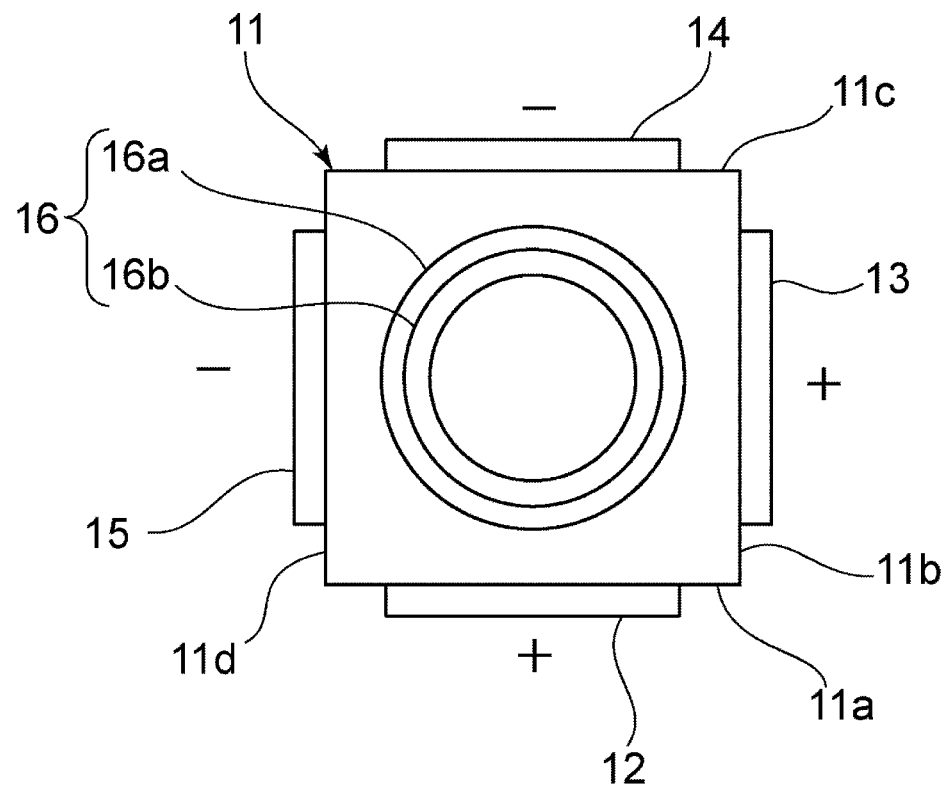
FIG. 6 is a plan view illustrating a method for driving the vibrating device of the camera according to the first preferred embodiment of the present invention.

Referring to FIG. 6, the signs "+" and "−" indicate that the alternating-current electric field is applied in opposite directions. More specifically, as illustrated in FIG. 6, the first and second piezoelectric vibrators 12 and 13 are driven in the same phase. The third and fourth piezoelectric vibrators 14 and are also driven in the same phase. The direction of the alternating-current electric field applied to the third and fourth piezoelectric vibrators 14 and 15 is opposite to the direction of the alternating-current electric field applied to the first and second piezoelectric vibrators 12 and 13. In other words, the first and second piezoelectric vibrators 12 and 13 are driven in a phase opposite to the phase in which the third and fourth piezoelectric vibrators 14 and 15 are driven.

Figure 7:
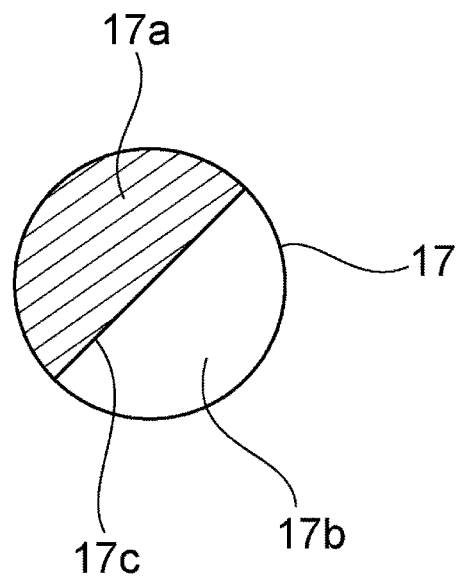
FIG. 7 is a schematic plan view illustrating a vibration mode of the light transmitting body unit in the driving method illustrated in FIG. 6.

As a result, the tubular body 11 is vibrated in a certain vibration mode, and the mode changing coupler 16 causes the light transmitting body unit 17 to vibrate. FIG. 7 is a schematic plan view illustrating a vibration mode of the light transmitting body unit 17. In FIG. 7, a hatched portion 17a and a non-hatched portion 17b are displaced in opposite directions. Therefore, the outer periphery and a boundary 17c between the hatched portion 17a and the non-hatched portion 17b define nodes of the vibration illustrated in FIG. 7. In the region hatched with oblique lines, the central portion surrounded by the vibration nodes defines a vibration antinode. In the blank white region, the central portion between the vibration nodes defines a vibration antinode.

A mechanical resonance mode of a member having a circular shape in plan view may be expressed as (m,n) mode, where m is the number of lines of nodes that are present in the radial direction, and n is the number of lines of nodes that are present in the circumferential direction. Here, m and n are integers. The vibration mode illustrated in FIG. 7 is (0,1) mode. When the light transmitting body unit 17 is vibrated in (0,1) mode, water droplets or other substances that have adhered to the outer surface of the light transmitting body unit 17 are able to be moved and atomized, and thus be removed. When the light transmitting body unit 17 is driven, water droplets on the vibration antinodes are atomized, and water droplets on the vibration nodes are moved toward the vibration antinodes. Therefore, water droplets are able to be moved away from the central region toward the peripheral region of the light transmitting body unit 17, and then be atomized. This will be described below with reference to FIGS. 12A to 12E.

Figure 8:
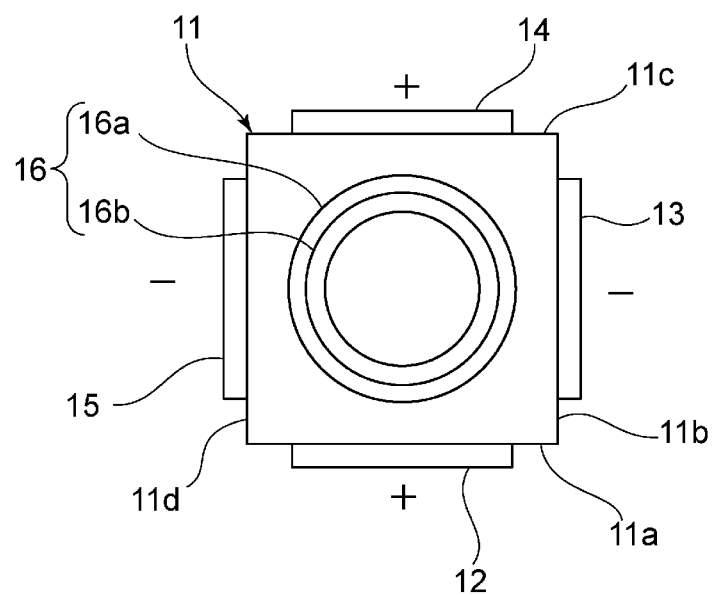
FIG. 8 is a plan view illustrating another example of a method for driving the vibrating device of the camera according to the first preferred embodiment of the present invention.
Figure 9:
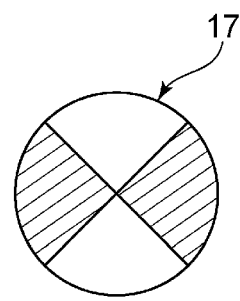
FIG. 9 is a schematic plan view illustrating a vibration mode of the light transmitting body unit in the driving method illustrated in FIG. 8.

In a driving method illustrated in FIG. 8, the first piezoelectric vibrator 12 and the third piezoelectric vibrator 14 are driven by signals in the same phase (+), and the second piezoelectric vibrator 13 and the fourth piezoelectric vibrator 15 are vibrated by signals in the opposite phase (−). In this case, the light transmitting body unit 17 is excited to vibrate in a vibration mode shown in the schematic plan view of FIG. 9. This vibration mode is (0,2) mode. In this case, similar to (0,1) mode, water droplets or other substances that have adhered to the outer surface of the light transmitting body unit 17 are able to be moved and atomized, and thus be removed. The best mode is (0,2) mode.

Figure 10:
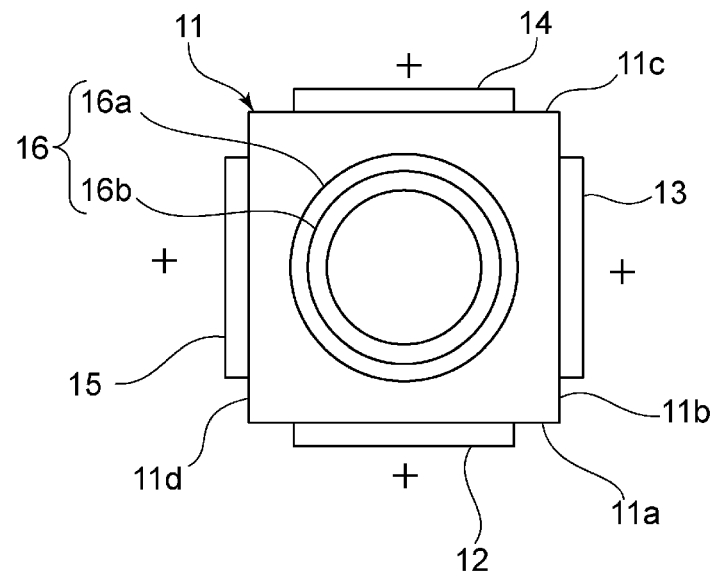
FIG. 10 is a plan view illustrating another example of a method for driving the vibrating device of the camera according to the first preferred embodiment of the present invention.
Figure 11A:
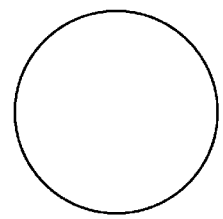
FIGS. 11A to 11C are schematic plan views illustrating vibration modes of the light transmitting body unit.
Figure 11B:
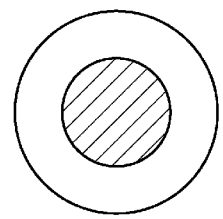
Figure 11C:
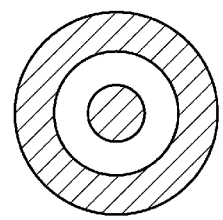

In a driving method illustrated in FIG. 10, the first to fourth piezoelectric vibrators 12 to 15 are all driven in the same phase. In this case, vibrations in (0,0) mode illustrated in FIG. 11A, (1,0) mode illustrated in FIG. 11B, and (2,0) mode illustrated in FIG. 11C are excited. When the light transmitting body unit 17 is vibrated in (0,0) mode, (1,0) mode, or (2,0) mode, the water droplets or other substances that have adhered to the outer surface of the light transmitting body unit 17 are able to be removed by directly atomizing the water droplets or other substances or by moving and then atomizing the water droplets or other substances. When the light transmitting body unit 17 is driven in the vibration mode illustrated in FIG. 11A, the water droplets or other substances that have adhered to the outer surface of the light transmitting body unit 17 are able to be removed by directly atomizing the water droplets or other substances. When n is 0 and concentric vibration is generated as illustrated in FIGS. 11B and 11C, the water droplets are able to be moved to the central region of the light transmitting body unit 17, and then atomized. However, when the water droplets are moved to the central region of the light transmitting body unit 17, the clarity of the field of view is reduced before the water droplets are atomized.

Figure 12A:
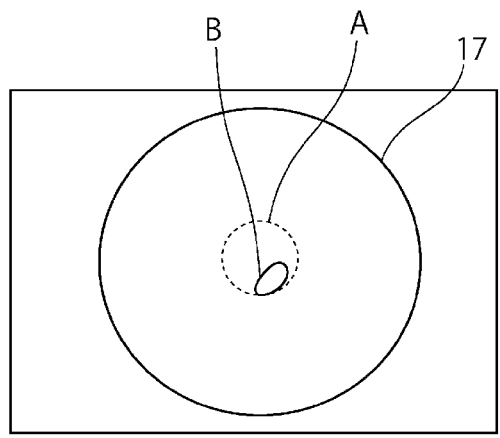
FIGS. 12A to 12E are schematic diagrams illustrating the steps for removing a water droplet using a water droplet removing device according to the first preferred embodiment of the present invention.
Figure 12D:
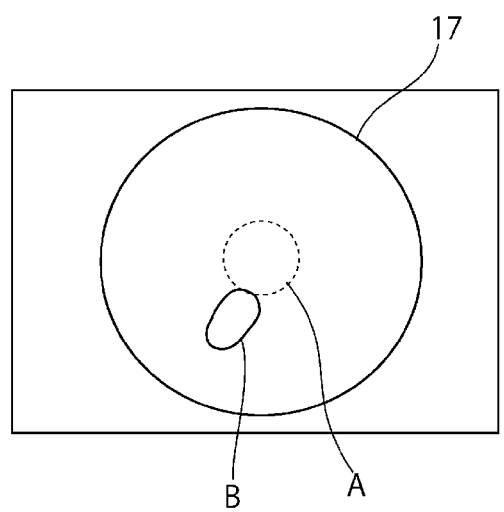
Figure 12B:
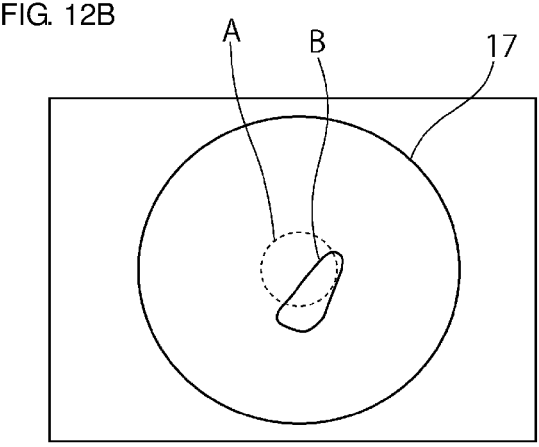
Figure 12E:
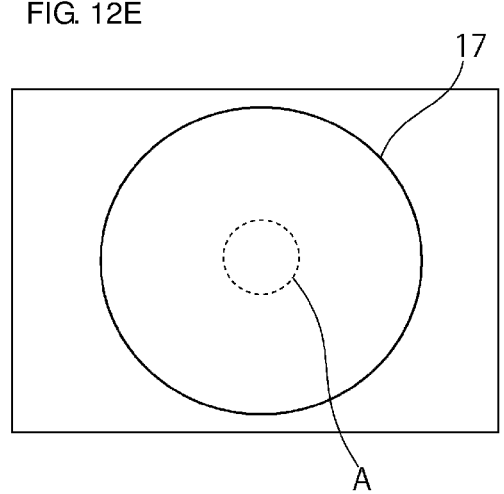
Figure 12C:
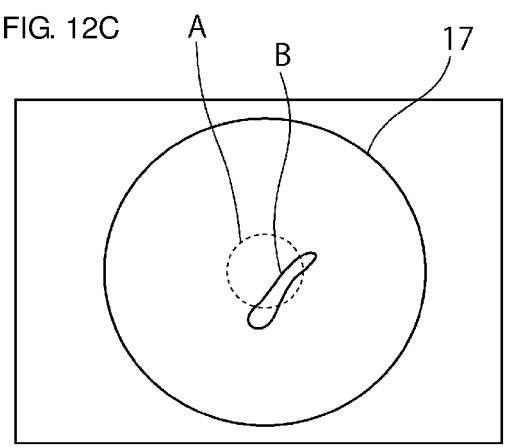

As illustrated in FIG. 12A, a field-of-view section A is provided at the center of the light transmitting body unit 17. Assume that a water droplet B is present in this section. When the light transmitting body unit 17 is vibrated in, for example, (0,2) mode in which the central region defines a node, as illustrated in FIG. 12B, the contact angle of the water droplet B with respect to the surface of the light transmitting body unit 17 is reduced, and the water droplet B spreads in a direction toward a vibration antinode. As illustrated in FIGS. 12C and 12D, the water droplet B gradually moves toward the peripheral region, where a vibration antinode is present. Upon reaching the vibration antinode, the water droplet B is atomized and disappears, as illustrated in FIG. 12E.

The substance that adheres to the camera may be a solution other than water, such as ethanol, an aqueous solution of salt, an antifreezing agent (calcium chloride), and other substances, droplets of liquid containing water insoluble impurities, such as mud water, or a colloidal solution, such as coffee (hereinafter referred to as liquid droplets), for example. Even in such a case, the substance is able to be removed in a similar manner. More specifically, large vibration of the light transmitting body unit 17 may be generated, so that the liquid droplets are atomized while the contents are dissolved therein. Thus, the liquid droplets that have adhered to the outer surface of the light transmitting body unit 17 are able to be removed. This operation differs from evaporation, and the liquid droplets are able to be removed together with the solutes/impurities contained therein without causing deposition of the solutes/impurities.

According to the vibrating device 10 of the present preferred embodiment, the amount of displacement of the light transmitting body unit 17 is able to be increased. Therefore, the atomization is able to be achieved without imparting a large load on the piezoelectric vibrator. This will be described with reference to FIGS. 13 and 14.

Figure 13:
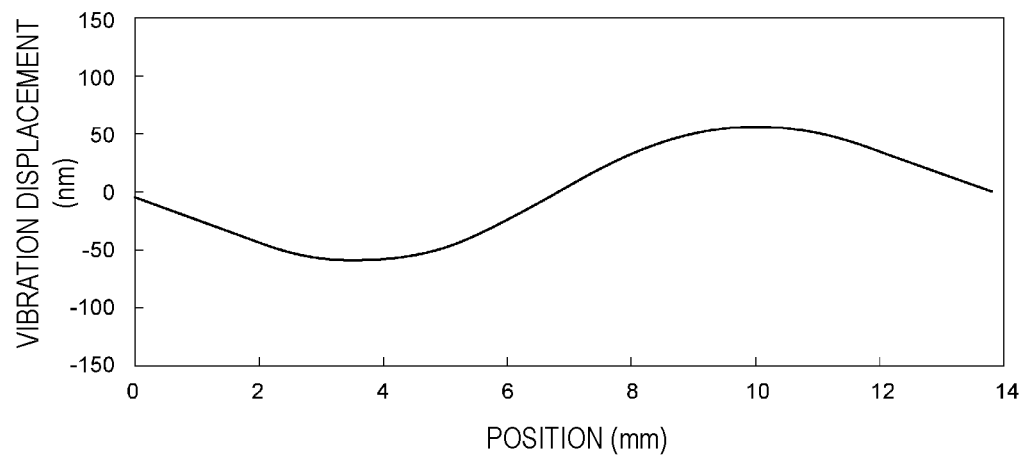
FIG. 13 is a graph showing the relationship between the position coordinate of a light transmitting body unit of a vibrating device according to a comparative example in the diameter direction and the vibration displacement.
Figure 14:
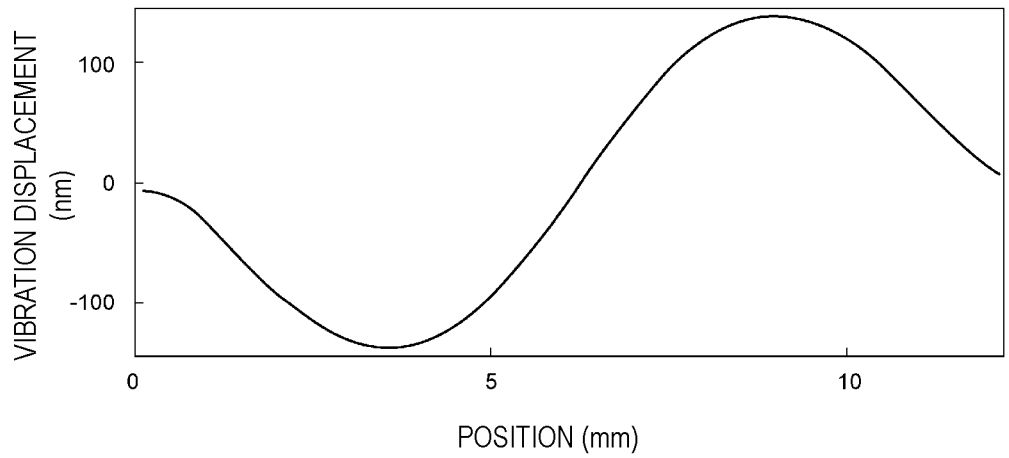
FIG. 14 is a graph showing the relationship between the position coordinate of the light transmitting body unit of the vibrating device according to the first preferred embodiment of the present invention in the diameter direction and the vibration displacement.

FIG. 13 is a graph showing the relationship between the position coordinate of a light transmitting body unit 17 of a vibrating device according to a comparative example in the diameter direction and the vibration displacement in the vertical direction per 1 Vp-p when the light transmitting body unit 17 is driven in (0,1) mode. FIG. 14 is a graph showing the relationship between the position coordinate of the light transmitting body unit 17 of the vibrating device according to the present preferred embodiment in the diameter direction and the vibration displacement in the vertical direction per 1 Vp-p when the light transmitting body unit 17 is driven in (0,1) mode.

The vibrating device of a water droplet removing device according to the comparative example includes a tubular body and a mode changing coupler having a cylindrical shape. The vibrating device is a Langevin vibrating device, and includes a ring-shaped piezoelectric vibrating element on the cylindrical body at an intermediate position thereof in the axial direction. The piezoelectric vibrating element is excited to vibrate the light transmitting body unit 17 fixed to an end of the cylindrical body.

The vibrating device according to the comparative example is similar to the vibrating device according to the above-described preferred embodiment except for the structure of the piezoelectric vibrating element and the position at which the piezoelectric vibrating element is fixed, and except that the tubular body and the mode changing coupler have a cylindrical shape.

A comparison between FIGS. 13 and 14 clearly shows that the vibration displacement of the light transmitting body unit 17 according to the present preferred embodiment is greater than that of the light transmitting body unit 17 according to the comparative example by a large amount. Thus, a larger amount of displacement is able to be obtained when the same voltage is applied as described above, and an amount of displacement equivalent to that obtained by the Langevin vibrating device according to the comparative example is able to be obtained at a lower driving voltage. Therefore, by using the vibrating device 10 according to the present preferred embodiment, the water droplets that have adhered to the outer surface of the light transmitting body unit 17 are able to be reliably atomized without imparting a large load on the first to fourth piezoelectric vibrators 12 to 15. In addition, the amount of power consumption is able to be reduced.

The tubular body 11 of the vibrating device 10 preferably has a quadrangular prismatic external shape. Therefore, the positions at which the first to fourth piezoelectric vibrators 12 to 15 are to be attached have a high degree of flexibility. When the tubular body is cylindrical as in the vibrating device according to the comparative example, the piezoelectric material needs to include portions polarized in opposite directions to induce non-symmetrical vibration. Alternatively, the excitation electrode needs to be divided into portions to be driven in opposite directions. Therefore, the vibration characteristics easily vary, and the regions in which the polarization is reversed or the portions into which the electrode is divided are required to have high positional accuracies.

When the vibrating device including a cylindrical tubular body is driven in (0,1) mode or (0,2) mode in which vibration nodes are present in the circumferential direction, the vibration nodes may essentially appear at any position within 360° in the circumferential direction. This state is called infinite degeneracy. The positions of the vibration nodes may be somewhat fixed by increasing the positional accuracy of the regions in which the polarization is reversed as described above. However, displacements from the ideal vibration nodes in the circumferential direction cause attenuation of the vibration and a reduction in efficiency. Thus, the cylindrical tubular body according to the comparative example is disadvantageous in terms of shape. In contrast, a tubular body having a diagonal line and a center line having different lengths as in the present preferred embodiment does not cause infinite degeneracy, and vibration having stable vibration nodes is able to be excited. As a result, the driving efficiency is able to be increased.

According to the vibrating device 10 of the present preferred embodiment, even when the first to fourth piezoelectric vibrators 12 to 15 are fixed to the first to fourth side surfaces 11a to 11d of the tubular body 11 with an accuracy equivalent to that for the cylindrical type, stable vibration nodes are able to be provided for the above-described reasons. Therefore, characteristics do not easily vary. Furthermore, the vibrating device 10 is able to be easily manufactured.

In the above-described preferred embodiment, the first to fourth piezoelectric vibrators 12 to 15 are polarized in the same direction. However, the direction of polarization is not limited to this. For example, vibrations in various modes may be generated by polarizing the first to fourth piezoelectric vibrators 12 to 15 in different directions and adjusting the direction of the alternating-current electric field that is applied.

Since the first to fourth piezoelectric vibrators 12 to 15 may be simply fixed to the first to fourth side surfaces 11a to 11d, respectively, the dimensions and polarization axes of the first to fourth piezoelectric vibrators 12 to 15 are able to be easily changed.

Although the mode changing coupler 16 is provided in the above-described preferred embodiment, the mode changing coupler 16 may be omitted. More specifically, the light transmitting body unit 17 may be directly connected to the other end 11f of the tubular body 11 to cover the cavity in the tubular body 11.

Although the first to fourth piezoelectric vibrators 12 to 15 are used in the above-described preferred embodiment, the present invention is not limited to this as long as at least one of the side surfaces is provided with a piezoelectric vibrator. Preferably, at least two of the side surfaces are each provided with a piezoelectric vibrator.

Figure 15:
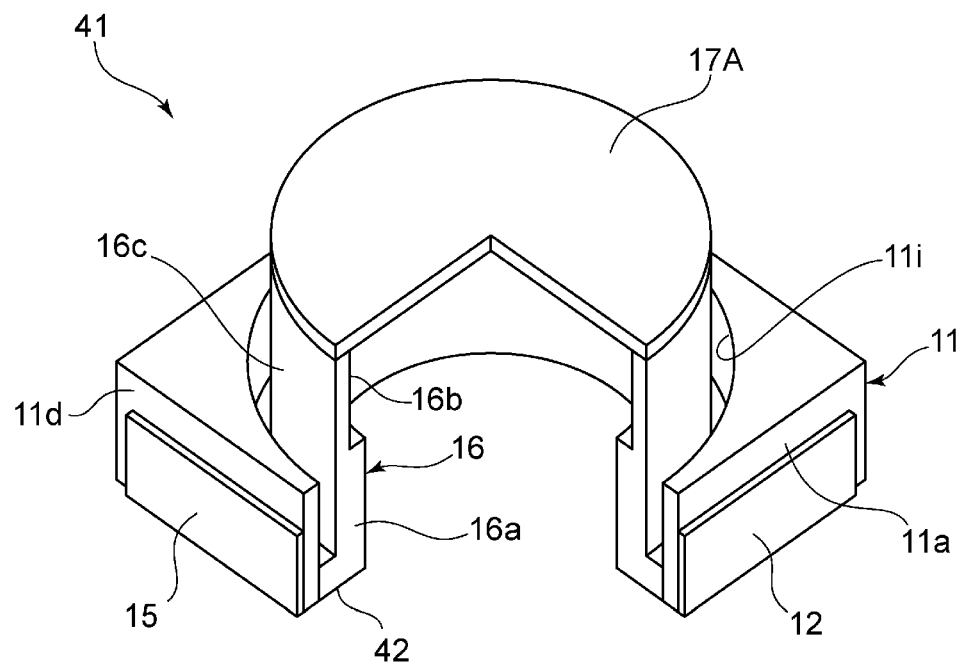
FIG. 15 is a partial cutaway perspective view of a vibrating device according to a second preferred embodiment of the present invention.

FIG. 15 is a partially cutaway perspective view of a vibrating device 41 according to a second preferred embodiment of the present invention. The vibrating device 41 includes a tubular body 11 having a quadrangular prismatic external shape. A mode changing coupler 16, which preferably has a cylindrical shape, is disposed in a cavity 11i in the tubular body 11. The cavity 11i is circular in plan view. The circular cavity 11i separates the tubular body 11 and an outer surface 16c of the mode changing coupler 16. A bottom end of a thick portion 16a of the mode changing coupler 16 is connected to an annular connecting portion 42. The annular connecting portion 42 extends radially outward from the bottom end of the mode changing coupler 16, and is connected to a bottom end portion of the tubular body 11.

Thus, the inner surface of the tubular body 11 that defines the cavity 11i faces the outer surface 16c of the mode changing coupler 16 with a gap therebetween.

A flat plate-shaped light transmitting body unit 17A is fixed to an end of the thin portion 16b of the mode changing coupler 16 and covers the cavity in the mode changing coupler 16. In other respects, the vibrating device 41 is the same as or similar to the vibrating device 10. As described above, the mode changing coupler 16 and the tubular body 11 may have a bent shape with the connecting portion 42 disposed therebetween. In this case, the light transmitting body unit 17A is able to be displaced by a larger amount when the tubular body 11 is excited. As a result, the load imparted on the first to fourth piezoelectric vibrators 12 to 15 is able to be further reduced.

Vibrating devices of this type preferably have a smaller height. Therefore, the height is preferably reduced. According to the present preferred embodiment, the tubular body 11 is bent at the bottom end of the mode changing coupler 16 with the connecting portion 42 disposed therebetween in sectional view. Accordingly, the vibrating device has a height smaller than that of a vibrating device that does not include such a bent shape and that provides the same amount of vibration when vibrated in the same vibration mode at the same vibration frequency.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vibrating device comprising:
   a tubular body including a first end, a second end that is opposite to the first end, and a plurality of side surfaces that connect the first end and the second end;
   a piezoelectric vibrator that is fixed to the tubular body and vibrates the tubular body;
   a light transmitting body unit that is directly or indirectly connected to the second end of the tubular body; and
   a mode changing coupler connected between the tubular body and the light transmitting body unit.

2. The vibrating device according to claim 1, wherein the tubular body has a polygonal tubular shape.

3. The vibrating device according to claim 1, wherein adjacent ones of the plurality of side surfaces are connected to each other by a curved portion.

4. The vibrating device according to claim 1, wherein the piezoelectric vibrator is provided on one of the plurality of side surfaces of the tubular body.

5. The vibrating device according to claim 1, wherein the tubular body has a quadrangular prismatic external shape, and the plurality of side surfaces include first to fourth side surfaces.

6. The vibrating device according to claim 5, wherein at least two of the first to fourth side surfaces are each provided with the piezoelectric vibrator.

7. The vibrating device according to claim 5, wherein the first to fourth side surfaces are each provided with the piezoelectric vibrator.

8. The vibrating device according to claim 1, wherein the mode changing coupler includes a tube including portions having different thicknesses.

9. The vibrating device according to claim 8, wherein
the tubular body includes a cavity that extends from the first end toward the second end and is circular or substantially circular in plan view when viewed from the one end;
an end portion of the mode changing coupler adjacent to the first end of the tubular body and an end portion of the tubular body at the first end of the tubular body are connected to each other by a connecting portion; and
an outer surface of the mode changing coupler faces an inner surface of the cavity in the tubular body.

10. A camera water-droplet-removing device for a camera main body including a lens, the camera water-droplet-removing device comprising:
the vibrating device according to claim 1; wherein
the light transmitting body unit includes the lens of the camera main body or a cover including a light transmitting portion disposed in front of the lens of the camera main body.

11. The camera water-droplet-removing device according to claim 10, wherein the tubular body has a polygonal tubular shape.

12. The camera water-droplet-removing device according to claim 10, wherein adjacent ones of the plurality of side surfaces are connected to each other by a curved portion.

13. The camera water-droplet-removing device according to claim 10, wherein the piezoelectric vibrator is provided on one of the plurality of side surfaces of the tubular body.

14. The camera water-droplet-removing device according to claim 10, wherein the tubular body has a quadrangular prismatic external shape, and the plurality of side surfaces include first to fourth side surfaces.

15. A camera comprising:
a camera water-droplet-removing device including the vibrating device according to claim 1; and
a camera main body, at least a portion of which is contained in the camera water-droplet-removing device.

16. The camera according to claim 15, wherein the tubular body has a polygonal tubular shape.

17. The camera according to claim 15, wherein adjacent ones of the plurality of side surfaces are connected to each other by a curved portion.

18. The camera according to claim 15, wherein the piezoelectric vibrator is provided on one of the plurality of side surfaces of the tubular body.

19. The camera according to claim 15, wherein the tubular body has a quadrangular prismatic external shape, and the plurality of side surfaces include first to fourth side surfaces.

* * * * *